(12) United States Patent
Takenaka et al.

(10) Patent No.: US 8,026,961 B2
(45) Date of Patent: Sep. 27, 2011

(54) SOLID-STATE IMAGE PICKUP APPARATUS HAVING EFFECTIVE AND NON-EFFECTIVE PIXEL PORTIONS, AND DRIVING METHOD THEREFOR

(75) Inventors: Shintaro Takenaka, Yokohama (JP); Tomoyuki Noda, Kawasaki (JP); Kazuhiro Sonoda, Yokohama (JP); Masaru Fujimura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/327,580

(22) Filed: Dec. 3, 2008

(65) Prior Publication Data

US 2009/0167913 A1 Jul. 2, 2009

(30) Foreign Application Priority Data

Dec. 28, 2007 (JP) ................................. 2007-341282

(51) Int. Cl.
*H04N 5/217* (2011.01)
(52) U.S. Cl. ....................................................... 348/241
(58) Field of Classification Search .................. 348/241, 348/243, 245, 294, 296
See application file for complete search history.

(56) References Cited

U.S. PATENT DOCUMENTS

| 6,653,617 | B2 | 11/2003 | Hiyama et al. | 250/214.1 |
| 6,791,619 | B1 * | 9/2004 | Misawa | 348/374 |
| 6,914,227 | B2 | 7/2005 | Kaifu et al. | 250/208.1 |
| 6,946,636 | B2 | 9/2005 | Eguchi et al. | 250/208.1 |
| 6,965,408 | B2 | 11/2005 | Hiyama et al. | 348/308 |
| 7,053,941 | B1 * | 5/2006 | Ohashi | 348/243 |
| 7,141,774 | B2 * | 11/2006 | Yuyama | 250/208.1 |
| 7,352,400 | B2 | 4/2008 | Sakurai et al. | 348/308 |
| 7,391,448 | B2 * | 6/2008 | Nishizawa et al. | 348/243 |
| 7,733,393 | B2 * | 6/2010 | Yoshida et al. | 348/249 |
| 2004/0150729 | A1 * | 8/2004 | Nishizawa et al. | 348/243 |
| 2004/0262495 | A1 * | 12/2004 | Yuyama | 250/208.1 |
| 2005/0269610 | A1 | 12/2005 | Hiyama et al. | 257/292 |

FOREIGN PATENT DOCUMENTS

JP 2005-176061 6/2005

* cited by examiner

*Primary Examiner* — Nicholas Giles
(74) *Attorney, Agent, or Firm* — Fitzpatrick, Cella, Harper & Scinto

(57) ABSTRACT

A solid-state image pickup device includes an effective pixel portion in which effective pixels are arranged in a matrix, the effective pixels each including a photoelectric conversion unit and outputting a first signal, a non-effective pixel portion in which non-effective pixels are arranged in at least one row, the non-effective pixels each including no photoelectric conversion unit and outputting a second signal, a vertical scanning unit for selecting each row of pixels in the effective and non-effective pixel portions, and an input section for externally receiving a third signal used to change a driving mode of the solid-state image pickup device. The vertical scanning unit begins electronic shutter scanning upon pixels in the effective pixel portion and causes each of pixels in the non-effective pixel portion to output the second signal after the input section has received the third signal and before the first signal is output.

11 Claims, 8 Drawing Sheets

SOLID-STATE IMAGE PICKUP APPARATUS HAVING EFFECTIVE AND NON-EFFECTIVE PIXEL PORTIONS, AND DRIVING METHOD THEREFOR

BACKGROUND OF THE INVENTION

1. Field of the Invention

The present invention relates to a solid-state image pickup device used in a video camera or the like and a driving method therefor.

2. Description of the Related Art

Noise superimposed on pixel signals of solid-state image pickup devices used in video cameras or the like can be broadly divided into random noise occurring in temporally and spatially random states, and fixed pattern noise occurring at the same position on an output image as vertical stripes or horizontal stripes. Random noise appears as uneven noise as if an entire screen is being viewed through frosted glass. Random noise occurs due to optical shot noise or thermal noise, and markedly varies with ambient temperature. On the other hand, fixed pattern noise occurs due to a variation of electrical characteristics between a pixel circuit and a reading circuit in a solid-state image pickup device. In particular, if different types of fixed pattern noises occur in different pixel columns, vertical stripes appear on an output image. These vertical stripes are conspicuous to human eyes.

In order to remove such different types of fixed pattern noises, the following technique is disclosed. First, a fixed pattern noise component is detected from signals (hereinafter referred to as noise measurement signals) output from a dummy line that is not connected to pixels capable of performing photoelectric conversion and is then stored. Subsequently, when a pixel signal (hereinafter referred to as an effective pixel signal) is output at the time of image capturing, the detected fixed pattern noise component is subtracted from the effective pixel signal so as to cancel the noise component.

Furthermore, a technique is disclosed for detecting a fixed pattern noise component reflecting variations in electrical characteristics among reading transistors in a row direction without being affected by a dark current (for example, see, Japanese Patent Laid-Open No. 2005-176061). Japanese Patent Laid-Open No. 2005-176061 discloses a technique for accurately canceling a fixed pattern noise component using non-effective pixels as a dummy line. Each of the non-effective pixels includes an amplification transistor and a reset transistor, but includes no photodiode.

In the technique disclosed in Japanese Patent Laid-Open No. 2005-176061, the number of dummy lines M for outputting a noise measurement signal is equal to or greater than the square of M, and the averaging of noise measurement signals output from each pixel column is performed so as to reduce the amount of a random noise component superimposed on a noise measurement signal to one Mth of the total amount of noise component or less. If the amount of the random noise component superimposed on a noise measurement signal is equal to or less than a quarter of the total amount of the noise component, random noise cannot be seen on a displayed image. By averaging noise measurement signals of a plurality of frames, a similar effect can be obtained with a smaller number of dummy lines. Furthermore, a solid-state image pickup device having a plurality of driving modes is known.

In Japanese Patent Laid-Open No. 2005-176061, there is no description about noise measurement signal acquisition timing after a driving mode has been changed. In order to meet a current request for noise reduction in a solid-state image pickup device, it is required to perform averaging of a larger number of noise measurement signals. In the above-described technique, although averaging of noise measurement signals output from $M^2$ (M=4) dummy lines, that is, sixteen dummy lines, is performed, averaging of a larger number of noise signals is required.

SUMMARY OF THE INVENTION

The present invention provides a solid-state image pickup device and a driving method therefor capable of performing an appropriate operation for obtaining noise measurement signals even if a driving mode is changed.

A solid-state image pickup device according to an embodiment of the present invention includes: an effective pixel portion in which effective pixels are arranged in a matrix, the effective pixels each including a photoelectric conversion unit for converting incident light into charge and outputting a first signal; a non-effective pixel portion in which non-effective pixels are arranged in at least one row, the non-effective pixels each having no photoelectric conversion unit and outputting a second signal; a vertical scanning unit configured to select each row of pixels included in the effective pixel portion and the non-effective pixel portion; and an input section configured to externally receive a third signal used to change a driving mode of the solid-state image pickup device. The vertical scanning unit begins electronic shutter scanning upon pixels included in the effective pixel portion and causes each of pixels included in the non-effective pixel portion to output the second signal after the input section has received the third signal and before the first signal is output.

A driving method according to an embodiment of the present invention is for a solid-state image pickup device including an effective pixel portion in which effective pixels are arranged in a matrix, the effective pixels each including a photoelectric conversion unit for converting incident light into charge and outputting a first signal, a non-effective pixel portion in which non-effective pixels are arranged in at least one row, the non-effective pixels each having no photoelectric conversion unit and outputting a second signal, and a vertical scanning unit configured to select each row of pixels included in the effective pixel portion or the non-effective pixel portion. The driving method includes the steps of: driving the solid-state image pickup device in two or more driving modes; and causing the vertical scanning unit to perform electronic shutter scanning upon pixels included in the effective pixel portion and causing each of pixels included in the non-effective pixel portion to output the second signal after switching between the driving modes has been performed and before the first signal is output.

According to an embodiment of the present invention, there can be provided a solid-state image pickup device and a driving method therefor capable of performing an appropriate operation for obtaining noise measurement signals even if a driving mode is changed.

Further features of the present invention will become apparent from the following description of exemplary embodiments with reference to the attached drawings.

DESCRIPTION OF THE EMBODIMENTS

Embodiments of the present invention will be described with reference to the accompanying drawings.

First Embodiment

Figure 1:
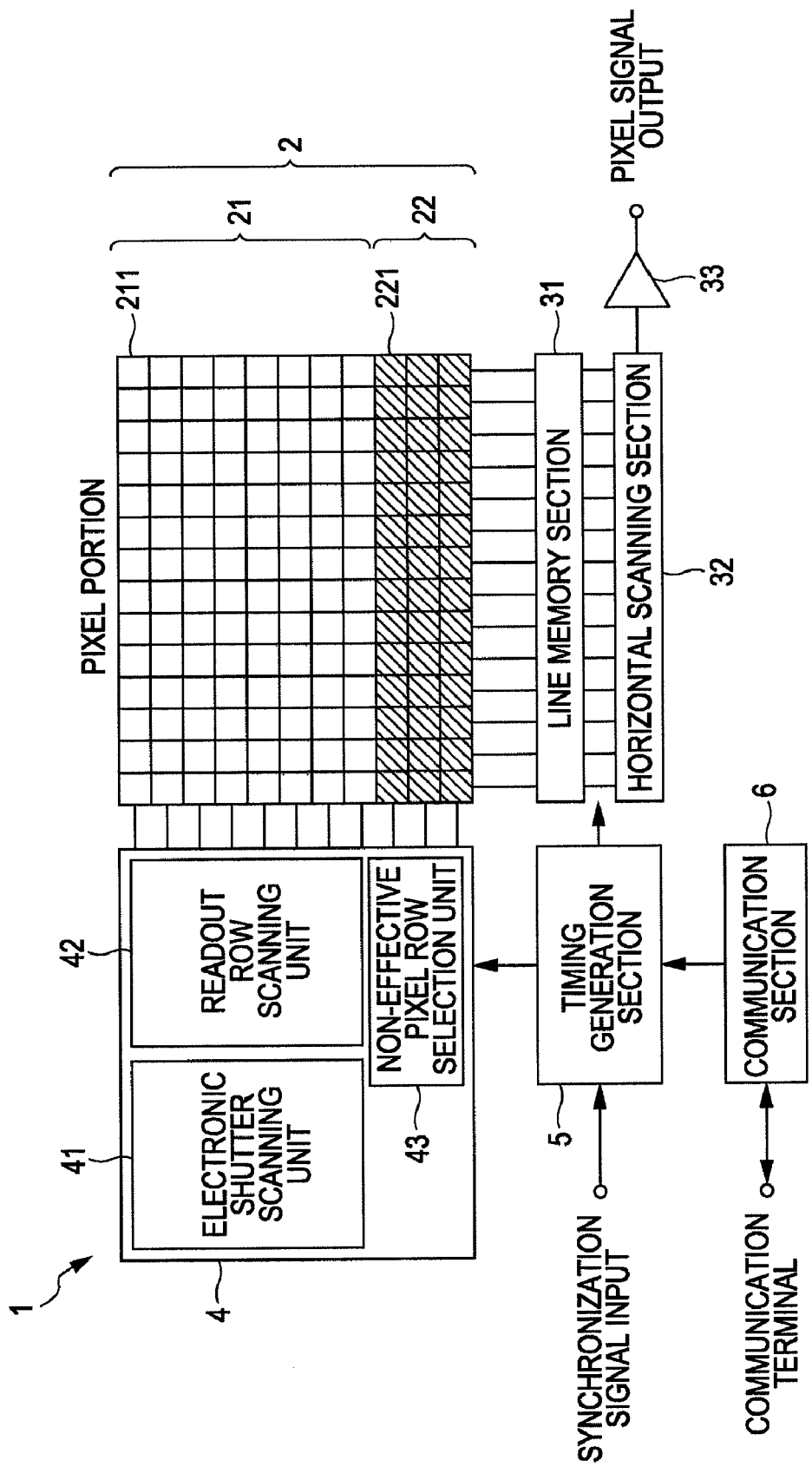
FIG. 1 is a block diagram illustrating an exemplary configuration of a solid-state image pickup device according to a first embodiment of the present invention.
Figure 2:
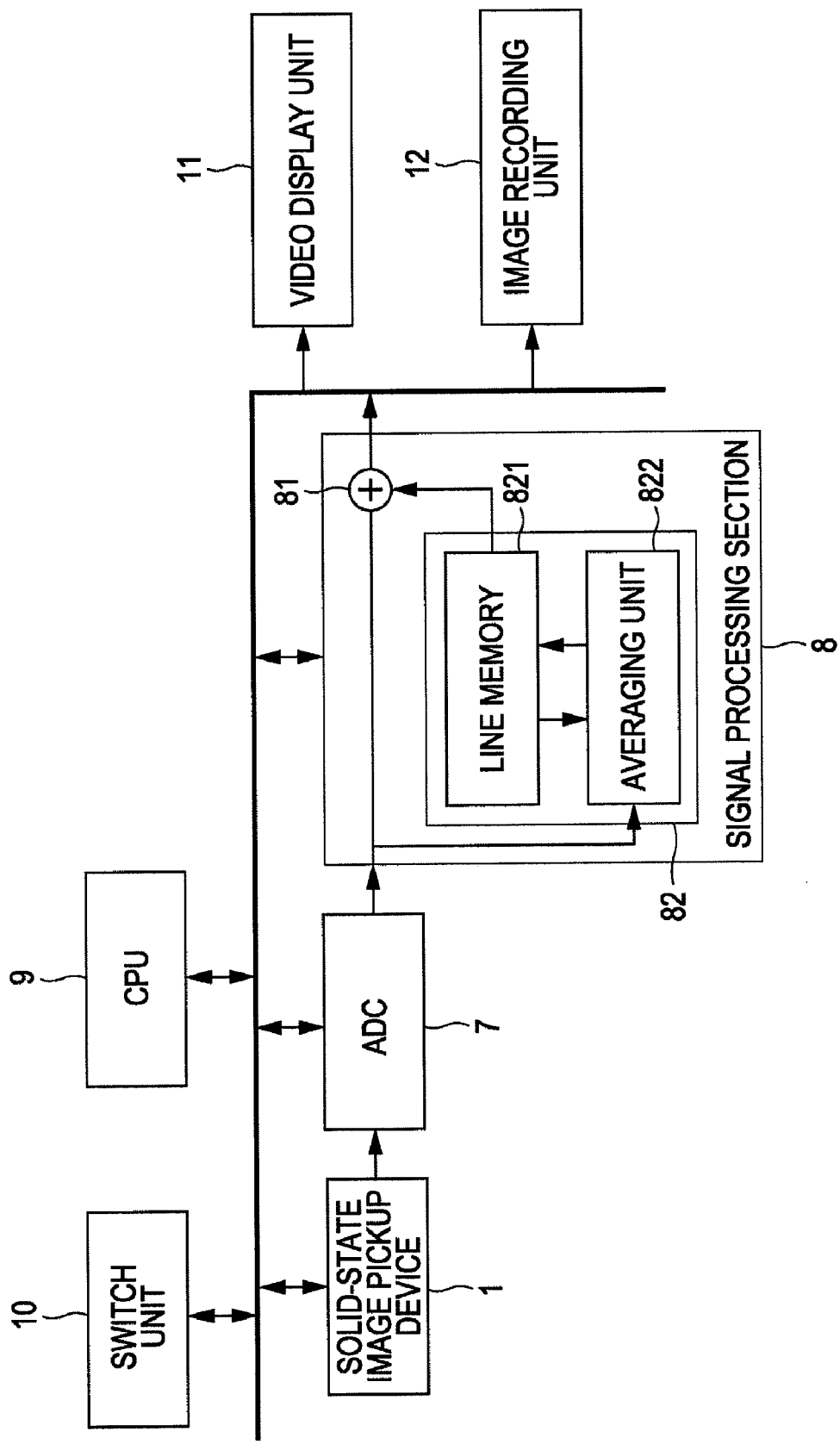
FIG. 2 is a block diagram illustrating an exemplary configuration of an image pickup system according to the first embodiment of the present invention.
Figure 3:
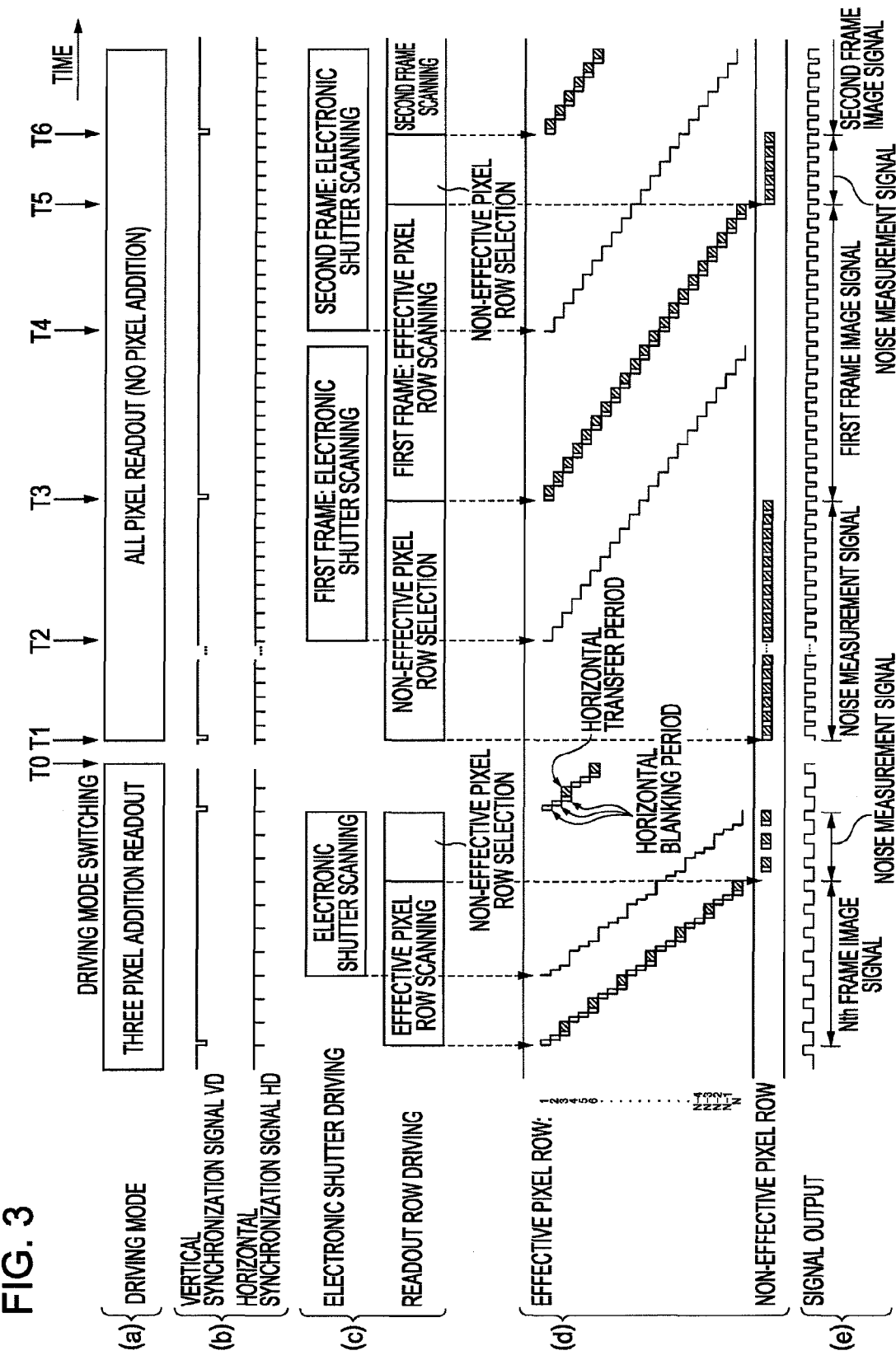
FIG. 3 is a timing chart illustrating a driving method of a solid-state image pickup device according to the first embodiment of the present invention.

A driving method of a solid-state image pickup device according to the first embodiment of the present invention will be described. FIG. 1 is a block diagram illustrating an exemplary configuration of a solid-state image pickup device according to the first embodiment of the present invention. FIG. 2 is a block diagram illustrating an exemplary configuration of an image pickup system according to the first embodiment of the present invention. FIG. 3 is a timing chart illustrating a driving method of a solid-state image pickup device according to the first embodiment of the present invention.

A solid-state image pickup device 1 illustrated in FIG. 1 includes a pixel portion 2, a vertical driving section 4, a line memory section 31, a horizontal scanning section 32, an amplifier 33, a timing generation section 5 for controlling the vertical driving section 4, the line memory section 31, and the horizontal scanning section 32, and a communication section 6. The pixel portion 2 includes a plurality of pixels that are two-dimensionally arranged. The timing generation section 5 is a driving mode selection section for driving the solid-state image pickup device in two or more driving modes, and generates a vertical synchronization signal and a horizontal synchronization signal. The line memory section 31 stores pixel signals read from a plurality of pixels in a single row that is selected in accordance with a control signal transmitted from the vertical driving section 4. The horizontal scanning section 32 sequentially transfers the pixel signals stored in the line memory section 31. The amplifier 33 amplifies each read pixel signal. The pixel portion 2 includes an effective pixel portion 21 composed of effective pixels 211 each including a photodiode for converting incident light into charge and a non-effective pixel portion 22 composed of non-effective pixels 221 each including no photodiode. The non-effective pixel portion 22 may be composed of a plurality of rows or a single row. In FIG. 1, the vertical driving section 4 includes an electronic shutter scanning unit 41, a readout row scanning unit 42, and a non-effective pixel row selection unit 43. However, the electronic shutter scanning unit 41 and the readout row scanning unit 42 may be integrated into a single scanning unit. Alternatively, the readout row scanning unit 42 and the non-effective pixel row selection unit 43 may be integrated into a signal scanning unit. Although not illustrated in FIG. 1, the solid-state image pickup device 1 includes a terminal (input section) for externally receiving a driving mode switching signal (third signal). For example, upon receiving the third signal, the timing generation section 5 changes timing in driving the vertical driving section 4 or the horizontal scanning section 32 or the gain of the amplifier 33.

The operations of the solid-state image pickup device 1 will be described. If each of the effective pixels 211 receives light, a photodiode included in each of the effective pixels 211 accumulates charge generated by photoelectric conversion. First, prior to a reading operation, an electronic shutter operation is performed. After the charge accumulated in a photodiode included in each of the effective pixels 211 in a single row selected by the electronic shutter scanning unit 41 has been reset to a reset potential, the photodiode again starts the accumulation of charge. Subsequently, after the charge accumulation period of time, which is set in accordance with the quantity of light, has elapsed, the charge accumulated in each of the effective pixels 211 in a row reselected by the readout row scanning unit 42 is read out and is then stored in the line memory section 31. Subsequently, the horizontal scanning section 32 sequentially outputs to the amplifier 33 pixel signals read by the line memory section 31 in accordance with a horizontal transfer pulse transmitted from the timing generation section 5. The amplifier 33 amplifies a received pixel signal and outputs the amplified pixel signal.

The reset row selection and the readout row selection are sequentially performed by the electronic shutter scanning unit 41 and the readout row scanning unit 42, respectively, at regular intervals, whereby the charge accumulation periods of rows included in the pixel portion 2 are made to be the same. Electronic shutter scanning, readout row scanning, and horizontal scanning are repeated, whereby the reading of signals from pixels included in a single screen is completed.

The addition of pixels included in the effective pixel portion 21 in the vertical direction is performed as follows. The readout row scanning unit 42 reads a pixel signal from each pixel in a selected row and stores the pixel signal in the line memory section 31. Subsequently, the readout row scanning unit 42 selects a row to be used for pixel addition, reads a pixel signal from each pixel in the selected row, and stores the pixel signal in the line memory section 31. In the line memory section 31, these pixel signals are added. The result of the addition of these pixel signals is transferred to the amplifier 33 by the horizontal scanning section 32 so as to be amplified, and is then output.

On the other hand, the non-effective pixel row selection unit 43 selects a row of the non-effective pixels 221 at the same timing as the electronic shutter scanning during a period in which the readout row scanning unit 42 does not select a row of pixels included in the effective pixel portion 21, and stores non-effective pixel signals in the line memory section 31. The non-effective pixel signals stored in the line memory section 31 are sequentially transferred to the amplifier 33 by the horizontal scanning section 32 so as to be amplified, and are then output as noise measurement signals.

Next, an exemplary configuration of an image pickup system illustrated in FIG. 2 will be described. An AD (Analog-to-Digital) converter 7 converts an analog image signal (first signal) output from the solid-state image pickup device 1 into a digital image signal by performing known analog signal processing upon the analog image signal. A signal processing section 8 subtracts a fixed pattern noise component from the digital image signal converted by the AD converter 7 so as to cancel the fixed pattern noise component. A fixed pattern noise component detection unit 82 includes a line memory 821 and an averaging unit 822. The fixed pattern noise component detection unit 82 performs averaging of noise measurement signals (second signals) output from a plurality of rows so as to reduce the amount of random noise component and generate a fixed pattern noise component, and stores the generated fixed pattern noise component in the line memory 821. A computation unit 81 subtracts the fixed pattern noise component stored in the line memory 821 from an image signal output from the effective pixel portion 21. A CPU 9 and a switch unit 10 are illustrated. The switch unit 10 includes a switch used to set an image capturing condition and a switch used to start an image capturing preparation operation or an image capturing operation. A video display unit 11 is, for example, an EVF (Electronic View Finder), and displays an image using display image data generated by the signal processing section 8. An image recording unit 12 records recording image data generated by the signal processing section 8 in an internal memory of a camera or a recording medium that can be attached to or detached from the camera.

A driving method of a solid-state image pickup device according to this embodiment will be described with reference to a timing chart illustrated in FIG. 3. FIG. 3(*a*) illustrates the driving mode of the solid-state image pickup device 1. Here, the driving mode means the driving method of the solid-state image pickup device 1. A driving mode employed in a case in which pixel addition is performed and a driving mode employed in a case in which pixel addition is not performed are different from each other. Furthermore, in the case in which pixel addition is performed, a driving mode is changed in accordance with the number of pixels to be added. FIG. 3(*b*) illustrates synchronization signals input into the timing generation section 5. FIG. 3(*c*) illustrates the operation of the vertical driving section 4 which is performed in the driving mode illustrated in FIG. 3(*a*) in synchronization with the synchronization signals illustrated in FIG. 3(*b*). FIG. 3(*d*) illustrates a scan state in which the pixel portion 2 is scanned row by row in the vertical direction in accordance with the operation of the vertical driving section 4 illustrated in FIG. 3(*c*). In the scan state of a readout row, there are a horizontal blanking period and a horizontal transfer period. In the horizontal blanking period, pixel signals are read out from pixels to the line memory section 31 starting from a row selected by the readout row scanning unit 42 or the non-effective pixel row selection unit 43. In the horizontal transfer period, these pixel signals are read out from the line memory section 31 by the horizontal scanning section 32. If a driving mode is a vertical three pixel addition mode, a horizontal blanking period in which pixel signals are read out from the first row to the line memory section 31, a horizontal blanking period in which pixel signals are read out from the second row to the line memory section 31, a horizontal blanking period in which pixel signals are read out from the third row to the line memory section 31, and a horizontal transfer period in which the results of the addition of three pixels are sequentially read out from the line memory section 31 are repeated. In the scan state of an electronic shutter row, reset timing of each photodiode in a row selected by the electronic shutter scanning unit 41 is illustrated. FIG. 3(*e*) illustrates a signal output from the solid-state image pickup device 1, that is, a signal that is output in accordance with readout row scanning or horizontal scanning illustrated in FIG. 3(*d*). After the scanning of effective pixel rows has been completed, the selection of a non-effective pixel row is continued until a vertical synchronization signal VD for the next frame is input into the timing generation section 5, whereby non-effective pixel signals, that is, noise measurement signals are output. A period between a time at which the vertical synchronization signal VD is input into the timing generation section 5 and a time at which the next vertical synchronization signal VD is input into the timing generation section 5 is called one frame period. Accordingly, in a frame period immediately after the driving mode has been changed, only pixel signals read out from the non-effective pixel row are output. Noise measurement signals generated in a frame period immediately after the driving mode has been changed are output in synchronization with the horizontal synchronization signal HD in the changed driving mode. That is, the number of rows from which the noise measurement signals are output in a frame period immediately after the driving mode has been changed is the same as the number of effective pixel rows read out in one frame period in the changed driving mode.

At a time T0, if it is required to change the driving mode of the solid-state image pickup device 1 by performing a switch operation, the CPU 9 communicates with the solid-state image pickup device 1 so as to change the driving mode of the solid-state image pickup device 1. For example, a three pixel addition readout mode (pixel addition mode) is changed to an all pixel readout mode (all pixel reading mode). In the all pixel readout mode, pixel addition is not performed. At a time T1, if the vertical synchronization signal VD is input into the timing generation section 5, the solid-state image pickup device 1 starts to operate in the changed driving mode (the all pixel readout mode in this case). At that time, the solid-state image pickup device 1 causes the non-effective pixel row selection unit 43 included in the vertical driving section 4 to select a non-effective pixel row so as to output a non-effective pixel signal, that is, a noise measurement signal. The non-effective pixel row selection unit 43 repeatedly selects the non-effective pixel row until the next vertical synchronization signal VD is input into the timing generation section 5 at a time T3, thereby outputting the number of noise measurement signals which is equal to or larger than that of noise measurement signals output from rows included in one frame. At a time T2, the electronic shutter scanning unit 41 starts to perform electronic shutter scanning for the first frame. At the time T3, if the vertical synchronization signal VD is input into the timing generation section 5, the solid-state image pickup device 1 causes the readout row scanning unit 42 included in the vertical driving section 4 to initiate scanning of effective pixel rows so as to output image pickup signals of the first frame. A period between the time T2 and the time T3 is a charge accumulation period of each effective pixel in the first frame. At a time T5 at which the scanning of the effective pixel rows has been completed, the solid-state image pickup device 1 causes the non-effective pixel row selection unit 43 included in the vertical driving section 4 to select the non-effective pixel row so as to output a non-effective pixel signal, that is, a noise measurement signal. Until the next vertical synchronization signal VD is input into the timing generation section 5 at a time T6, the non-effective pixel row selection unit 43 repeatedly selects the non-effective pixel row a plurality of times, thereby outputting noise measurement signals. At a time T4, the electronic shutter scanning unit 41 starts to perform electronic shutter scanning for the second frame. By repeatedly performing the driving process from the time T3 to the time T6, image pickup signals are output as a moving image.

FIG. 3(*d*) illustrates the driving method of repeatedly reading out a single non-effective pixel row. However, if the non-effective pixel portion 22 is composed of a plurality of rows, the scanning of these rows included in the non-effective pixel portion 22 may be repeatedly performed. With a number of dummy lines for outputting a noise measurement signal that is about one tenth of the total number of readout rows, the amount of a random noise component can be significantly reduced. Approximately 100 dummy lines or less may be disposed in the non-effective pixel portion 22, and the scanning of the non-effective pixel portion 22 may be repeatedly performed using these dummy lines. This can prevent the increase in the area of a solid-state image pickup device due to installation of dummy lines, and achieve averaging of characteristic variations between dummy lines. A dummy line installation area is not limited to the area illustrated in FIG. 1, and may be an area on the upper side of the pixel portion 2. The above-described points can be applied to the following other embodiments. In this embodiment, if a driving mode is changed, pixel addition is not performed. In addition to this, an operation performed in each period indicated by the time interval between the horizontal synchronization signals HD or the vertical synchronization signals VD is also changed. For example, prior to the time T0, the time interval between the horizontal synchronization signals HD includes the horizontal blanking period for three rows and the horizontal transfer period for a single row. On the other hand, subsequent to the time T1 at which a driving mode is changed, the time interval between the horizontal synchronization signals HD is shortened, and includes the horizontal blanking period for only one row and the horizontal transfer period for a single row. Thus, after the driving mode has been changed, an operation performed in the time interval between the horizontal synchronization signals HD is changed. Furthermore, an operation performed in the time interval between the vertical synchronization signals VD is also changed. The driving mode may be changed not only to the all pixel reading mode in which signals are read out from all pixels included in an effective pixel portion but also to a thinned-out reading mode in which pixels to be read are selected from among all the pixels so that the density of the selected pixels becomes low and a cutout reading mode in which signals are read out from only a part of an area. The driving mode change causes a change in the characteristic of each column, for example, a change in the gain of a gain-variable amplifier (column amplification unit) disposed for columns included in a pixel portion in a solid-state image pickup device.

Noise measurement signals output from the solid-state image pickup device 1 are input into the fixed pattern noise component detection unit 82 included in the signal processing section 8. The averaging unit 822 performs averaging of received noise measurement signals output from the non-effective pixel row on a pixel column-by-pixel column basis so as to reduce the amount of a random noise component, whereby a fixed pattern noise component is detected. The fixed pattern noise is stored in the line memory 821. The computation unit 81 subtracts the fixed pattern noise stored in the line memory 821 from a pixel signal output from the effective pixel portion 21 so as to remove the fixed pattern noise.

As described previously, Japanese Patent Laid-Open No. 2005-176061 discloses a case in which the detection of a fixed pattern noise component is performed using a plurality of frames. The difference between that case and this embodiment will be described with reference to a timing chart illustrated in FIG. 8.

Figure 8:
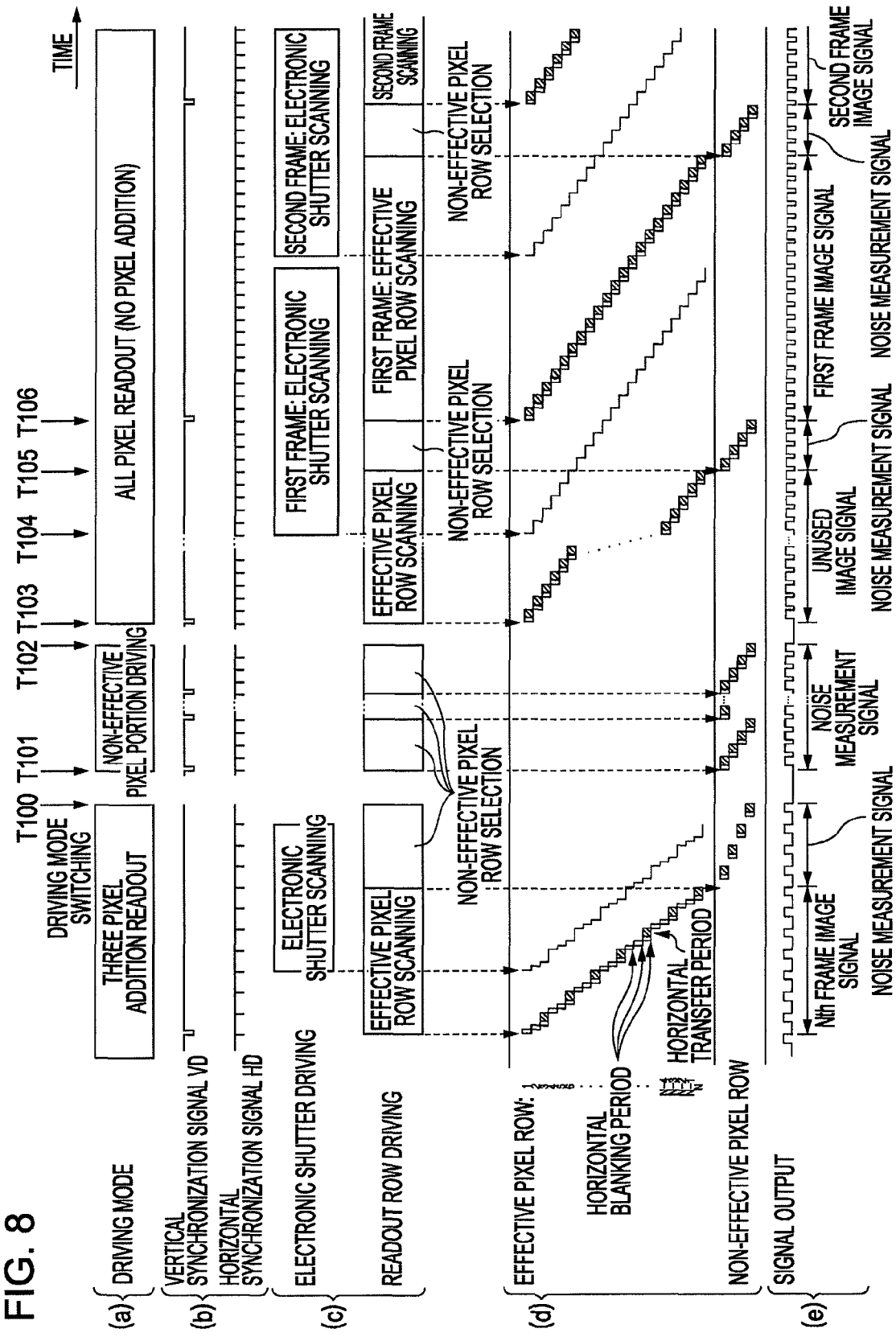
FIG. 8 is a timing chart illustrating a driving method of a solid-state image pickup device in the related art.

In order to obtain noise measurement signals prior to a time T106 that is an image signal output start time in the first frame after a driving mode has been changed, the scanning of non-effective pixel rows is performed over a plurality of frames in a period from a time T101 to a time T102. At a time T103, the readout scanning of effective pixel rows is started. Here, prior to the time T103, electronic shutter scanning is not performed. That is, the charge accumulation period of each pixel is not controlled. Accordingly, in an obtained image, brightness variations occur in the row direction. Furthermore, the brightness of the obtained image is different from that of another image obtained in another frame. These pixel signals obtained by the readout scanning starting from the time T103 cannot therefore be used. As described previously, noise measurement signals output from sixteen rows may be insufficient to reduce the amount of the random noise component. In this case, if the operations illustrated in FIG. 8 are performed, electronic shutter scanning is performed after the acquisition of noise measurement signals has been completed. Accordingly, a time lag between a time at which a driving mode is changed and a time at which a first available image signal is output becomes more pronounced in a solid-state image pickup device requiring noise reduction.

According to the first embodiment of the present invention, before image signals are output in the first frame after the driving mode of the solid-state image pickup device 1 has been changed, a sufficient number of noise measurement signals to perform averaging of random noise components can be output regardless of the number of rows in the non-effective pixel portion 22. By causing the fixed pattern noise component detection unit 82 included in the signal processing section 8 to perform averaging of these noise measurement signals, a fixed pattern noise component with a significantly reduced amount of random noise component can be detected. The signal processing section 8 can successfully remove the fixed pattern noise component from an image signal of the first frame. The number of rows in the non-effective pixel portion 22 can be reduced. By repeatedly reading out a noise measurement signal from each of the reduced number of rows, the increase in the area of the solid-state image pickup device 1 and the increase in cost can be prevented. In the above-described embodiment, noise measurement signals are output during the electronic shutter scanning period in the first frame. Accordingly, signal reading frames illustrated in FIG. 8, that is, frames between a time T100 to the time T103 in which noise measurement signals are output, is not required. Furthermore, a time lag between a time at which a driving mode is changed and a time at which the first image signal of the first frame is output does not occur.

If the selection of the non-effective pixel row is started at the time T2 illustrated in FIG. 3 after the driving mode has been changed, a time interval between a time at which a driving mode is changed and a time at which the first image signal of the first frame is output can be further shortened.

Second Embodiment

Next, focusing attention on points different from the first embodiment, the second embodiment of the present invention will be described.

The solid-state image pickup device 1 according to this embodiment has a partial pixel reading mode (screen cutout mode) having a function of specifying pixels from which pixel signals will be read out and outputting an image obtained by uniformly thinning out pixels included in the effective pixel portion 21 and a function of outputting an image obtained by cutting out a part of the effective pixel portion 21. In the partial pixel reading mode, vertical thinning between rows, horizontal thinning between pixels, and screen cutout can be performed, and pixel addition is not performed.

A driving method of a solid-state image pickup device according to this embodiment will be described with reference to a timing chart illustrated in FIG. 4. At a time T10, if it is required to change the driving mode of the solid-state image pickup device 1 by performing a switch operation, the CPU 9 communicates with the solid-state image pickup device 1 so as to change the driving mode of the solid-state image pickup device 1. For example, the pixel addition mode (the three pixel addition readout mode) is changed to the partial pixel reading mode (the screen cutout mode). At a time T11, if the vertical synchronization signal VD is input into the timing generation section 5, the solid-state image pickup device 1 starts to operate in the screen cutout mode. At that time, the solid-state image pickup device 1 causes the non-effective pixel row selection unit 43 included in the vertical driving section 4 to select a non-effective pixel row a plurality of times so as to read out non-effective pixel signals to the line memory section 31. Subsequently, the horizontal scanning section 32 sequentially selects pixel signals starting from a pixel signal output from a non-effective pixel connected to a column specified as a readout start column and outputs these non-effective pixel signals, that is, noise measurement signals. The horizontal scanning section 32 repeatedly performs this operation until the next vertical synchronization signal VD is input into the timing generation section 5 at a time T13, thereby outputting the number of noise measurement signals which is equal to or larger than that of noise measurement signals output from rows included in one frame. At a time T12, the electronic shutter scanning unit 41 starts to perform electronic shutter scanning for the first frame in accordance with a screen cutout position. Subsequent to the time T13, readout scanning and the electronic shutter scanning are repeatedly performed in accordance with the screen cutout position, whereby image pickup signals can be obtained as a moving image. A period between a time at which the vertical synchronization signal VD is input into the timing generation section 5 and a time at which the next vertical synchronization signal VD is input into the timing generation section 5 is called one frame period. Accordingly, in a frame period immediately after the driving mode has been changed, only pixel signals read out from the non-effective pixel row are output. Noise measurement signals generated in a frame period immediately after the driving mode has been changed are output in synchronization with the horizontal synchronization signal HD in the changed driving mode. That is, the number of rows from which the noise measurement signals are output in a frame period immediately after the driving mode has been changed is the same as the number of effective pixel rows read out in one frame period in the changed driving mode.

According to the second embodiment of the present invention, before image signals are output in the first frame after the driving mode of the solid-state image pickup device 1 has been changed, a sufficient number of noise measurement signals to perform averaging of random noise components can be output. The number of the noise measurement signals is changed in accordance with the screen cutout position or a pixel thinning rate. Accordingly, it is possible to successfully remove the fixed pattern noise component from an image signal of the first frame after the driving mode has been changed. Both of the driving mode change illustrated in FIG. 3 and the driving mode change illustrated in FIG. 4 may be performed.

Third Embodiment

Next, focusing attention on points different from the first embodiment, the third embodiment of the present invention will be described.

Figure 5:
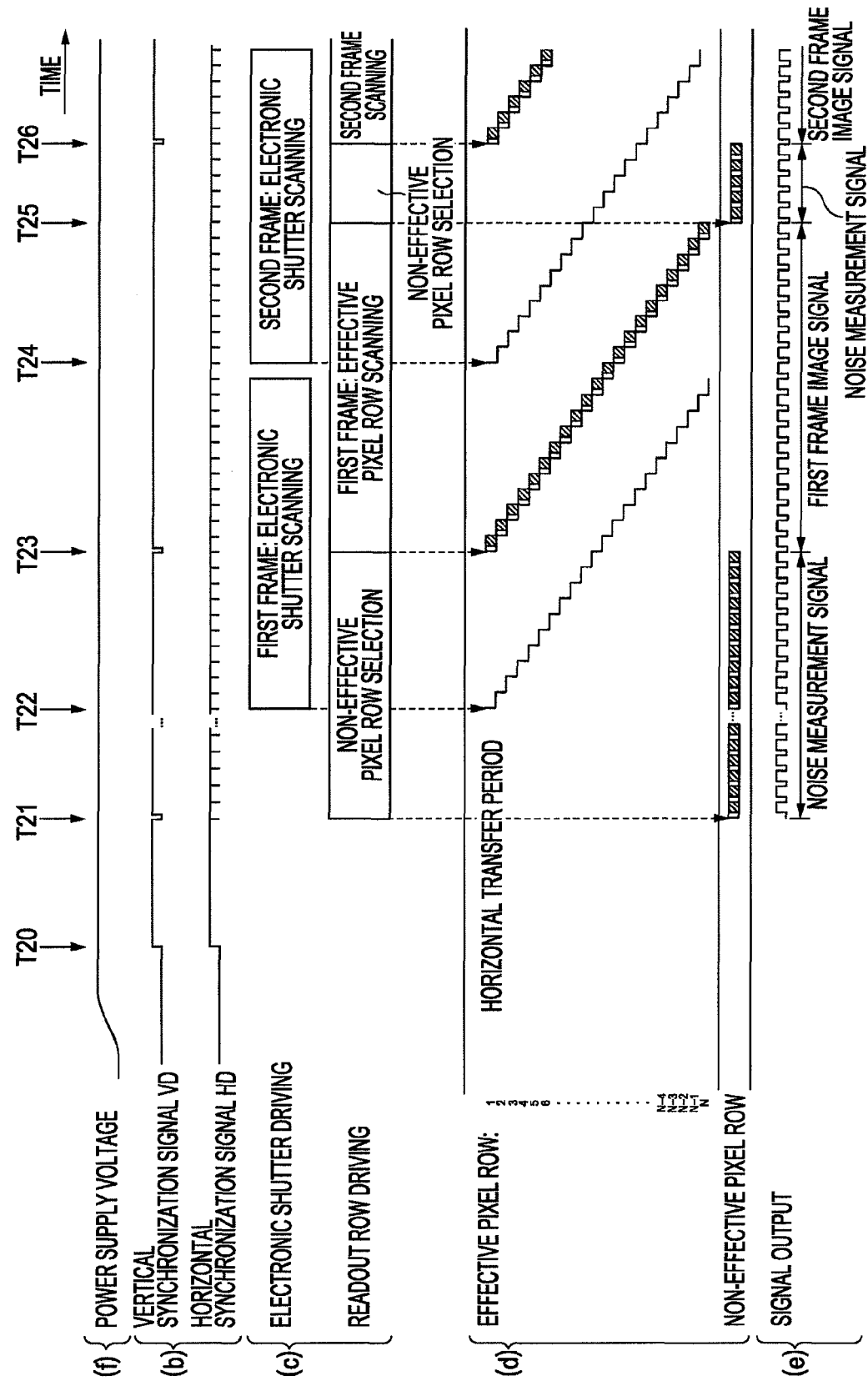
FIG. 5 is a timing chart illustrating a driving method of a solid-state image pickup device according to a third embodiment of the present invention.

FIG. 5 is a timing chart illustrating a driving method of a solid-state image pickup device according to this embodiment. FIG. 5(f) illustrates the waveform of a power supply voltage supplied to the solid-state image pickup device 1. At a time T20, if a power supply voltage is stabilized, the CPU 9 communicates with the solid-state image pickup device 1 so as to make initial settings for the solid-state image pickup device 1. At a time T21 at which the initial settings for the solid-state image pickup device 1 have already been completed, if the vertical synchronization signal VD is input into the timing generation section 5, the solid-state image pickup device 1 starts to operate in an initially set driving mode. At that time, the solid-state image pickup device 1 causes the non-effective pixel row selection unit 43 included in the vertical driving section 4 to select a non-effective pixel row so as to output a non-effective pixel signal, that is, a noise measurement signal. The non-effective pixel row selection unit 43 repeatedly selects the non-effective pixel row a plurality of times until the vertical synchronization signal VD is input into the timing generation section 5 at a time T23, thereby outputting the number of noise measurement signals which is equal to or larger than that of noise measurement signals output from rows included in one frame. At a time T22, the electronic shutter scanning unit 41 starts to perform electronic shutter scanning for the first frame. Subsequent to the time T23, readout scanning and the electronic shutter scanning are repeatedly performed, whereby image pickup signals can be obtained as a moving image. A period between a time at which the vertical synchronization signal VD is input into the timing generation section 5 and a time at which the next vertical synchronization signal VD is input into the timing generation section 5 is called one frame period. Accordingly, in a frame period immediately after the driving mode has been changed, only pixel signals read out from the non-effective pixel row are output. Noise measurement signals generated in a frame period immediately after the driving mode has been changed are output in synchronization with the horizontal synchronization signal HD in the changed driving mode. That is, the number of rows from which the noise measurement signals are output in a frame period immediately after the driving mode has been changed is the same as the number of effective pixel rows read out in one frame period in the changed driving mode.

According to the third embodiment of the present invention, before image signals are output in the first frame immediately after the solid-state image pickup device 1 has been powered on, a sufficient number of noise measurement signals to perform averaging of random noise components can be output. Accordingly, it is possible to successfully remove the fixed pattern noise component from an image signal of the first frame immediately after the solid-state image pickup device 1 has been powered on.

Fourth Embodiment

Next, focusing attention on points different from the first embodiment, the fourth embodiment of the present invention will be described.

Figure 6:
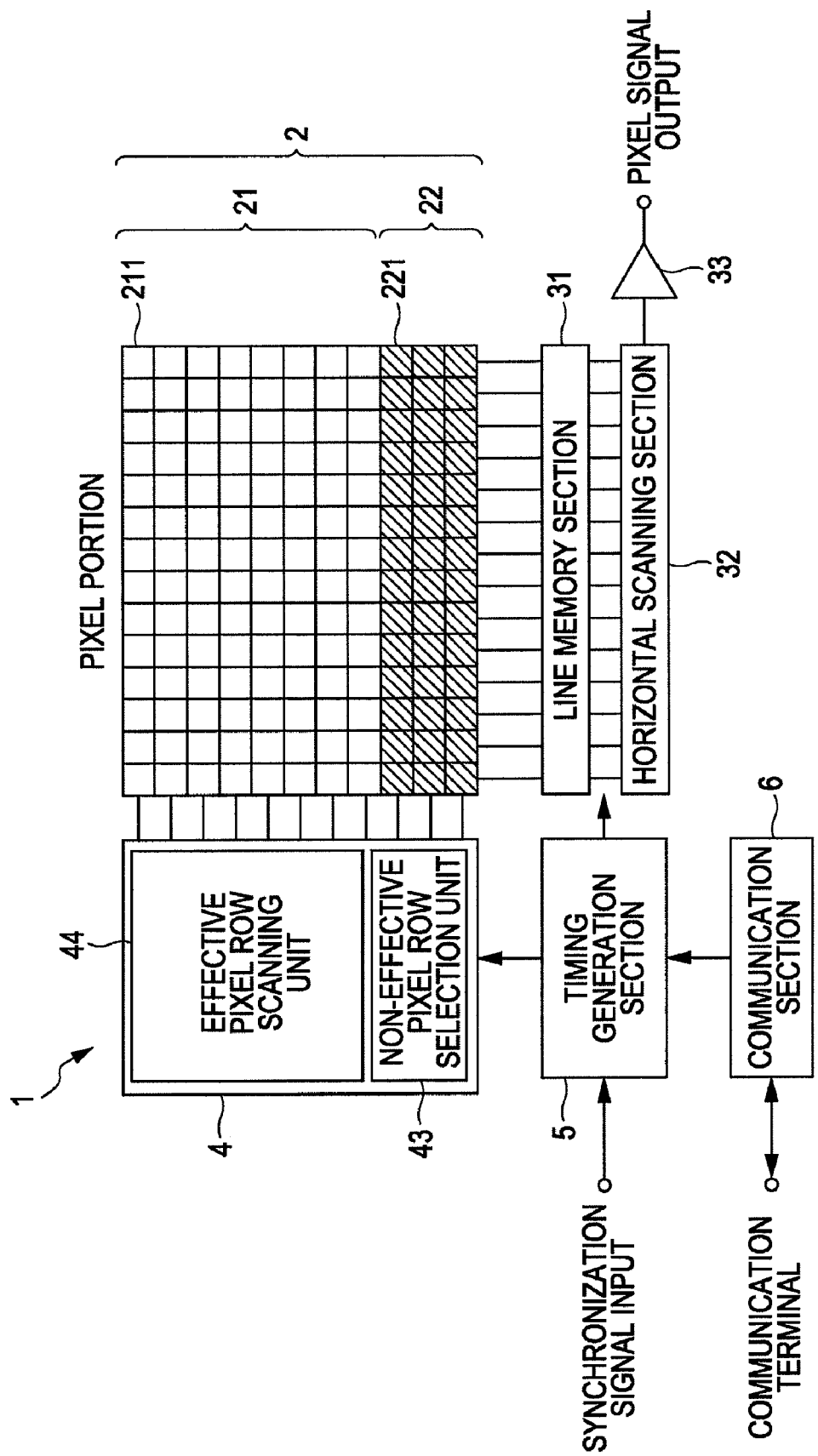
FIG. 6 is a block diagram illustrating an exemplary configuration of a solid-state image pickup device according to a fourth embodiment of the present invention.

FIG. 6 is a block diagram illustrating an exemplary configuration of a solid-state image pickup device according to this embodiment. The vertical driving section 4 included in the solid-state image pickup device 1 according to this embodiment includes an effective pixel row scanning unit 44. The effective pixel row scanning unit 44 performs electronic shutter scanning and readout row scanning at the same time. At that time, it is impossible to separately control the electronic shutter scanning and the readout row scanning.

Figure 7:
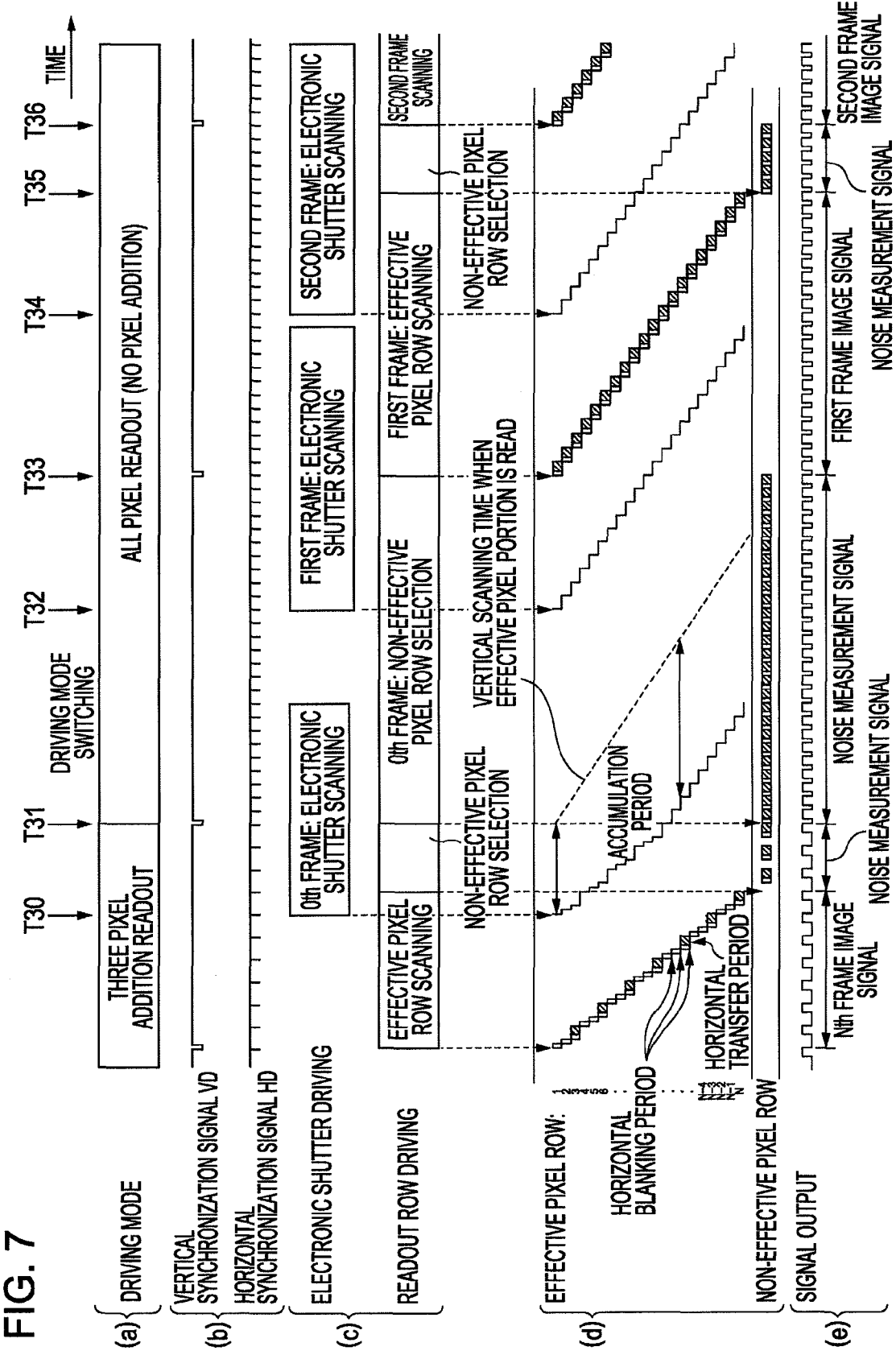
FIG. 7 is a timing chart illustrating a driving method of a solid-state image pickup device according to the fourth embodiment of the present invention.

FIG. 7 is a timing chart illustrating a driving method of a solid-state image pickup device according to this embodiment. First, at a time T30, the electronic shutter scanning is started in a three pixel addition readout mode. Subsequently, at a time T31 at which the vertical synchronization signal VD is input into the timing generation section 5, the driving mode of the solid-state image pickup device 1 is changed. In FIG. 7, the three pixel addition readout mode is changed to an all pixel readout mode. In accordance with the driving mode change, at the time T31, the scan timing of the vertical driving section 4 is also changed. That is, the timing of the electronic shutter scanning that has been started at the time T30 is changed before the scanning of all effective pixel rows is completed.

At a time T31, it is assumed that the scanning of these effective pixel rows is performed. In this case, as illustrated in FIG. 7, the charge accumulation periods of the individual effective pixel rows are not the same and an obtained image cannot therefore be used.

Accordingly, from the time T31, the non-effective pixel row selection unit 43 continues to repeatedly select the non-effective pixel row a plurality of times so as to output non-effective pixel signals, that is, noise measurement signals.

At a time T32, the effective pixel row scanning unit 44 starts to perform electronic shutter scanning for the first frame after the driving mode has been changed. At a time T33, if the vertical synchronization signal VD is input into the timing generation section 5, the effective pixel row scanning unit 44 starts to perform the readout scanning of the effective pixel rows so as to obtain image signals of the first frame. A period between a time at which the vertical synchronization signal VD is input into the timing generation section 5 and a time at which the next vertical synchronization signal VD is input into the timing generation section 5 is called one frame period. Accordingly, in a frame period immediately after the driving mode has been changed, only pixel signals read out from the non-effective pixel row are output. Noise measurement signals generated in a frame period immediately after the driving mode has been changed are output in synchronization with the horizontal synchronization signal HD in the changed driving mode. That is, the number of rows from which the noise measurement signals are output in a frame period immediately after the driving mode has been changed is the same as the number of effective pixel rows read out in one frame period in the changed driving mode.

According to the fourth embodiment of the present invention, by outputting noise measurement signals that are equal in number as those output from rows included in one frame instead of outputting unavailable image signals, it is possible to remove the fixed pattern noise component from an image signal of the next frame. In this embodiment, since the solid-state image pickup device 1 does not include a dedicated vertical driving section for electronic shutter scanning, the chip size of the solid-state image pickup device 1 can be reduced. This leads to cost reduction.

According to a driving method of a solid-state image pickup device according to each of the first, second, third, and fourth embodiments, noise measurement signals are output from a dummy line a plurality of times during electronic shutter driving in the first readout frame immediately after the driving mode of the solid-state image pickup device has been changed or image capturing has been started. As a result, a sufficient number of noise measurement signals to perform averaging of random noise components can be obtained prior to readout processing in the first frame. Accordingly, the amount of the random noise component can be significantly reduced, and fixed pattern noise can be accurately removed from a pixel signal of the first frame. Since it is not required to increase the number of dummy lines, the increase in the area of the solid-state image pickup device can be prevented. This leads to cost reduction. Since noise measurement signals are output during electronic shutter driving, the occurrence of a time lag between a time at which the driving mode of the solid-state image pickup device is changed or image capturing is started and a time at which an effective pixel signal is output can be prevented.

A solid-state image pickup device according to each of the first, second, third, and fourth embodiments includes the effective pixel portion 21 including the effective pixels 211 which are two-dimensionally arranged and each of which includes a photoelectric conversion unit, and the non-effective pixel portion 22 including the non-effective pixels 221 which are arranged in at least one row and each of which includes no photoelectric conversion unit. For example, the photoelectric conversion unit is a photodiode. Referring to FIG. 3, the non-effective pixel row selection unit 43 selects signals output from the non-effective pixels 221 arranged in the same row a plurality of times and outputs these selected signals immediately after a driving mode has been changed.

Referring to FIG. 3, the electronic shutter scanning unit 41 resets the photoelectric conversion unit included in each of the effective pixels 211 while the non-effective pixel row selection unit 43 selects the signals output from the non-effective pixels 221 arranged in the same row a plurality of times.

Referring to FIG. 3, the readout row scanning unit 42 selects signals output from the effective pixels 211 on a row-by-row basis and outputs the selected signals after the electronic shutter scanning unit 41 has reset the photoelectric conversion unit included in each of the effective pixels 211.

Referring to FIG. 3, as the driving mode, the pixel addition mode (three pixel addition readout mode) and the all pixel reading mode (all pixel readout mode) are illustrated. In the pixel addition mode, the line memory section 31 adds a plurality of signals output from the effective pixels 211 which are selected by the readout row scanning unit 42 and stores the addition result. In the all pixel reading mode, the line memory section 31 stores a plurality of signals output from the effective pixels 211 which are selected by the readout row scanning unit 42 without adding them. The non-effective pixel row selection unit 43 selects the signals output from the non-effective pixels 221 arranged in the same row a plurality of times and outputs the selected signals immediately after the pixel addition mode has been changed to the all pixel reading mode.

Figure 4:
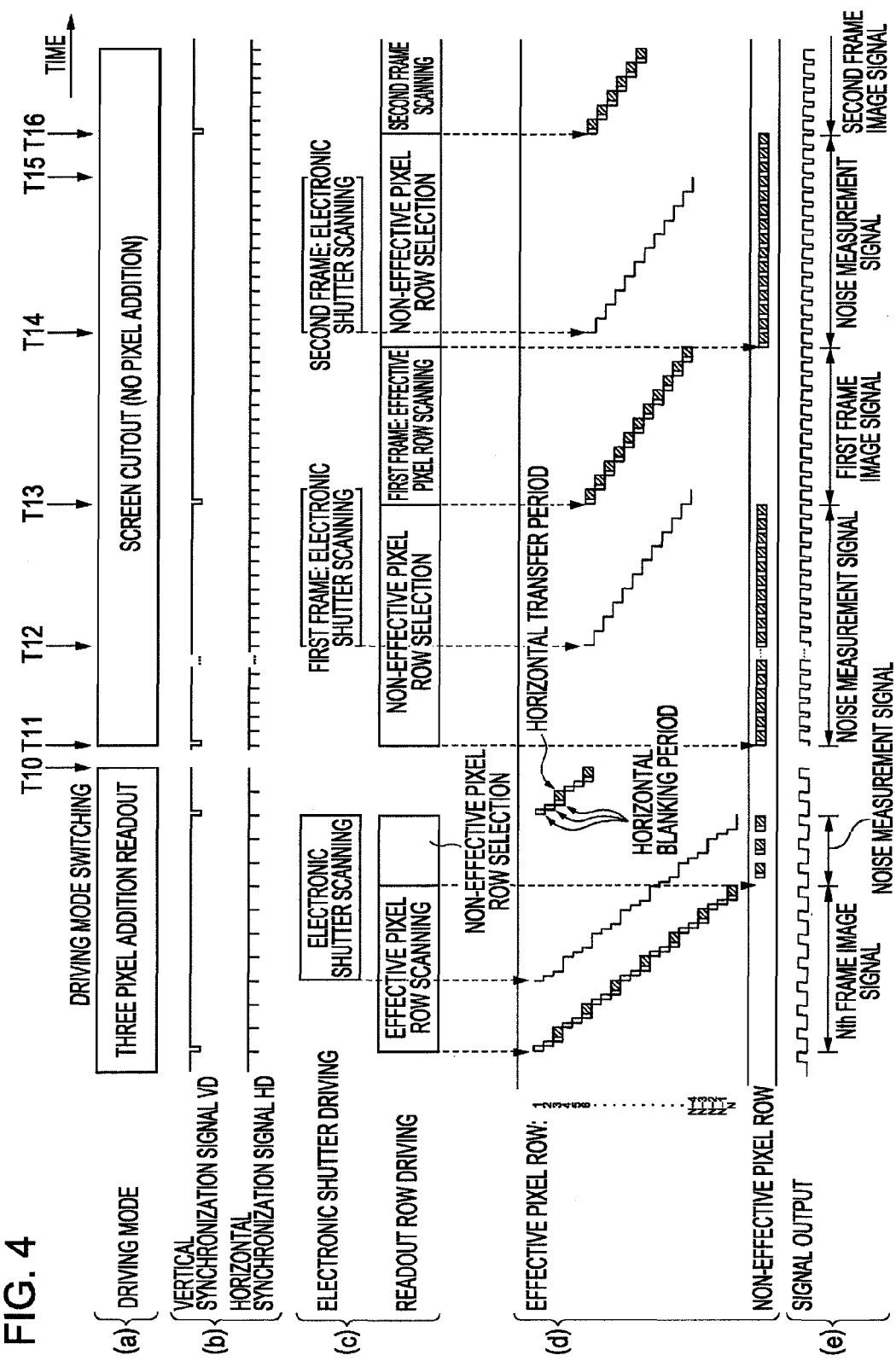
FIG. 4 is a timing chart illustrating a driving method of a solid-state image pickup device according to a second embodiment of the present invention.

Referring to FIG. 4, as the driving mode, the partial pixel reading mode (screen cutout mode) and the pixel addition mode (three pixel addition readout mode) are illustrated. In the partial pixel reading mode, the readout row scanning unit 42 selects signals output from the effective pixels 211 in some of all rows. In the pixel addition mode, the readout row scanning unit 42 selects signals output from the effective pixels 211 in all the rows. In the pixel addition mode, the line memory section 31 adds the signals output from the effective pixels 211 which are selected by the readout row scanning unit 42 and stores the addition result. In the partial pixel addition mode, the line memory section 31 stores the signals output from the effective pixels 211 which are selected by the readout row scanning unit 42 without adding them. The non-effective pixel row selection unit 43 selects the signals output from the non-effective pixels 221 arranged in the same row a plurality of times and outputs the selected signals immediately after the pixel addition mode has been changed to the partial pixel reading mode.

Referring to FIG. 5, the non-effective pixel row selection unit 43 selects the signals output from the non-effective pixels 221 arranged in the same row a plurality of times and outputs the selected signals during a frame period prior to the first effective frame period (the first frame) after power has been turned on.

By selecting a signal output from a non-effective pixel a plurality of times, the number of non-effective pixel rows can be reduced and the area of a solid-state image pickup device can therefore be reduced. Furthermore, the occurrence of a time lag between a time at which a driving mode is changed or image capturing is started and a time at which the first frame is output can be prevented.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-341282 filed Dec. 28, 2007, which is hereby incorporated by reference herein in its entirety.

What is claimed is:

1. A solid-state image pickup device comprising:
   an effective-pixel portion in which effective pixels including photoelectric conversion units that convert incident light into charge are arranged in a matrix;
   a non-effective-pixel portion in which non-effective pixels that include no photoelectric conversion unit are arranged in at least one row; and
   a vertical scanning unit that selects the pixels arranged in the effective-pixel portion and the non-effective-pixel portion on a row-by-row basis,
   the solid-state image pickup device outputting first signals based on the effective-pixel portion and second signals based on the non-effective-pixel portion,
   wherein the solid-state image pickup device further includes an input section that receives, from outside, a third signal for switching between driving modes of the solid-state image pickup device, and
   wherein the vertical scanning unit starts performing electronic shutter scanning on the pixels arranged in the effective-pixel portion and causes only the second signals to be output immediately after the input section has received the third signal until the first signals are output.

2. The solid-state image pickup device according to claim 1, wherein the driving modes include any one of an adding mode, in which the first signals output from the pixels arranged in the effective-pixel portion are added to one another, an all-pixel reading mode, in which the first signals output from all of the pixels arranged in the effective-pixel portion are read independently from one another, a partial pixel reading mode, in which the first signals are read from only some of the pixels arranged in the effective-pixel portion, and power-on of the solid-state image pickup device.

3. The solid-state image pickup device according to claim 1, further comprising a column amplification unit which is provided for columns in the effective-pixel portion and whose gain is variable, wherein the driving modes include setting of the gain.

4. The solid-state image pickup device according to claim 1, wherein the number of rows in the non-effective-pixel portion from which the vertical scanning unit causes the second signals to be output immediately after the input section has received the third signal until the first signals are output is equal to the number of rows in the effective-pixel portion from which the first signals are caused to be output during one frame time period in the switched driving mode.

5. The solid-state image pickup device according to claim 1, wherein the number of rows in the non-effective-pixel portion is equal to or smaller than one tenth of the number of rows in the effective-pixel portion.

6. The solid-state image pickup device according to claim 5, wherein the number of rows in the non-effective-pixel portion is equal to or smaller than 100, and wherein the vertical scanning unit causes the second signals to be output, a plurality of times, from at least one row of pixels in the non-effective-pixel portion immediately after switching between the drive modes has been performed until the first signals are output.

7. The solid-state image pickup device according to claim 1, wherein the vertical scanning unit includes:
   an electronic shutter scanning unit that selects the pixels arranged in the effective-pixel portion on a row-by-row basis to reset the photoelectric conversion units; and
   a read scanning unit that selects the pixels arranged in the effective-pixel section and the non-effective-pixel section on a row-by-row basis to cause the first signals to be output;
   wherein the electronic shutter scanning unit resets the photoelectric conversion units arranged in the effective-pixel portion in a time period in which the read scanning unit selects the non-effective-pixels to cause the second signals to be output, and
   wherein the read scanning unit starts an operation of selecting the pixels arranged in the effective-pixel portion after reset of the photoelectric conversion units has been performed by the electronic shutter scanning unit.

8. A method for driving a solid-state image pickup device, the solid-state image pickup device including:
   an effective-pixel portion in which effective pixels including photoelectric conversion units that convert incident light into charge are arranged in a matrix;
   a non-effective-pixel portion in which non-effective-pixels that include no photoelectric conversion unit are arranged in at least one row; and
   a vertical scanning unit that selects the pixels arranged in the effective-pixel portion and the non-effective-pixel portion on a row-by-row basis,
   the solid-state image pickup device outputting first signals based on the effective-pixel portion and second signals based on the non-effective-pixel portion;
   wherein the method comprises:
   driving the solid-state image pickup device in two or more driving modes; and
   starting performing electronic shutter scanning on the pixels arranged in the effective-pixel portion and causing only the second signals to be output immediatel' after switching between the drive modes has been performed until the first signals are output.

9. The method for driving the solid-state image pickup device according to claim 8, wherein the driving modes include any one of an adding mode, in which the first signals output from the pixels arranged in the effective-pixel portion are added to one another, an all-pixel reading mode, in which the first signals output from all of the pixels arranged in the effective pixel portion are read independently from one another, a partial pixel reading mode, in which the first signals are read from only some of the pixels arranged in the effective-pixel portion, and power-on of the solid-state image pickup device.

10. The method for driving the solid-state image pickup device according to claim 8, wherein the solid-state image pickup device further includes a column amplification unit which is provided for columns in the effective-pixel portion and whose gain is variable, and wherein the driving modes include setting of the gain.

11. The method for driving the solid-state image pickup device according to claim 8, wherein the number of rows in the non-effective-pixel portion from which the second signals are caused to be output immediately after switching between the driving modes has been performed until the first signals are output is equal to the number of rows in the effective-pixel portion from which outputting is performed during one frame time period in the switched driving mode.

* * * * *